United States Patent
Chang et al.

(10) Patent No.: US 8,506,856 B2
(45) Date of Patent: Aug. 13, 2013

(54) METHOD FOR MAKING SILICONE HYDROGEL CONTACT LENSES

(75) Inventors: Frank Chang, Suwanee, GA (US); Jüergen Vogt, Flueh (CH)

(73) Assignee: Novartis AG, Basel (CH)

( * ) Notice: Subject to any disclaimer, the term of this patent is extended or adjusted under 35 U.S.C. 154(b) by 752 days.

(21) Appl. No.: 12/327,930

(22) Filed: Dec. 4, 2008

(65) Prior Publication Data

US 2009/0146330 A1    Jun. 11, 2009

Related U.S. Application Data

(60) Provisional application No. 61/012,504, filed on Dec. 10, 2007.

(51) Int. Cl.
*B29D 11/00* (2006.01)
*G02B 1/12* (2006.01)

(52) U.S. Cl.
USPC .......... 264/1.32; 264/1.1; 264/1.31; 264/1.38; 264/299; 264/319; 264/328.1; 264/328.17; 264/330; 264/331.11; 264/478; 264/494; 264/496

(58) Field of Classification Search
USPC .................................. 264/1.32, 1.38
See application file for complete search history.

(56) References Cited

U.S. PATENT DOCUMENTS

| | | | | |
|---|---|---|---|---|
| 3,408,429 | A * | 10/1968 | Wichterle | 264/2.1 |
| 4,229,273 | A | 10/1980 | Wajs | 204/159.13 |
| 5,219,965 | A | 6/1993 | Valint, Jr. et al. | 526/245 |
| 5,227,432 | A | 7/1993 | Jung | 525/286 |
| 5,336,797 | A | 8/1994 | McGee et al. | 556/419 |
| 5,387,663 | A | 2/1995 | McGee et al. | 526/279 |
| 5,449,729 | A | 9/1995 | Lai | 526/286 |
| 5,505,884 | A | 4/1996 | Burke et al. | 264/1.1 |
| 5,563,184 | A | 10/1996 | McGee et al. | 523/107 |
| 5,665,840 | A | 9/1997 | Pohlmann et al. | 526/264 |
| 5,708,094 | A | 1/1998 | Lai et al. | 525/296 |
| 5,741,830 | A * | 4/1998 | Kamiya et al. | 523/106 |
| 5,807,944 | A | 9/1998 | Hirt et al. | 526/279 |
| 5,981,669 | A | 11/1999 | Valint, Jr. et al. | 525/477 |
| 5,981,675 | A | 11/1999 | Valint, Jr. et al. | 526/279 |
| 5,998,498 | A | 12/1999 | Vanderlaan et al. | 523/107 |
| 6,015,609 | A * | 1/2000 | Chaouk et al. | 428/308.4 |
| 6,039,913 | A * | 3/2000 | Hirt et al. | 264/331.11 |
| 6,225,367 | B1 | 5/2001 | Chaouk et al. | 521/149 |
| 6,627,124 | B1 * | 9/2003 | Herbrechtsmeier et al. | 264/1.36 |
| 6,762,264 | B2 | 7/2004 | Kunzler et al. | 526/279 |
| 6,765,083 | B2 | 7/2004 | Ford et al. | 528/491 |
| 6,822,016 | B2 | 11/2004 | McCabe et al. | 523/107 |
| 6,943,203 | B2 | 9/2005 | Vanderlaan et al. | 523/107 |
| 7,052,131 | B2 | 5/2006 | McCabe et al. | 351/160 H |
| 7,091,283 | B2 | 8/2006 | Muller et al. | 525/292 |
| 7,238,750 | B2 | 7/2007 | Muller et al. | 525/292 |
| 7,249,848 | B2 | 7/2007 | Laredo et al. | 351/160 H |
| 7,268,189 | B2 | 9/2007 | Müller et al. | 525/292 |
| 2005/0237483 | A1 | 10/2005 | Phelan | 351/162 |
| 2006/0235162 | A1 | 10/2006 | Muller et al. | 525/292 |
| 2007/0037897 | A1 | 2/2007 | Wang et al. | 523/106 |
| 2007/0132949 | A1 | 6/2007 | Phelan | 351/166 |
| 2008/0015315 | A1 | 1/2008 | Chang et al. | 525/326.9 |

FOREIGN PATENT DOCUMENTS

| | | |
|---|---|---|
| DE | 37 10343 | 3/1987 |
| EP | 0 216 074 | 6/1993 |
| EP | 0 331 633 | 1/1997 |
| WO | WO 92/09421 | 6/1992 |
| WO | WO 92/18548 | 10/1992 |
| WO | WO 93/09084 | 5/1993 |
| WO | WO 93/23773 | 11/1993 |
| WO | WO 98/25982 | 6/1998 |
| WO | WO 00/59970 | 10/2000 |

OTHER PUBLICATIONS

PCT International Search Report.
PCT Written Opinion of the International Searching Authority.

* cited by examiner

*Primary Examiner* — Christina Johnson
*Assistant Examiner* — Atul P. Khare
(74) *Attorney, Agent, or Firm* — Jian Zhou

(57) ABSTRACT

The invention provides a method for making silicone hydrogel contact lenses. The method of the invention is characterized by using a solvent mixture including at least one organic solvent which dissolves the polymerizable material in a lens-forming composition and a small amount of water. By having a small amount of water in the lens-forming composition, the mechanical strength of lenses cast-molded from the lens-forming composition can be sufficiently high so that the lenses can survives during mold opening and demolding process, thereby increasing the production yield.

11 Claims, No Drawings

METHOD FOR MAKING SILICONE HYDROGEL CONTACT LENSES

This application claims the benefit under 35 U.S.C. §119(e) of U.S. provisional application Ser. No. 61/012,504 filed Dec. 10, 2007, herein incorporated by reference in its entirety.

The present invention is related to a method for making silicone hydrogel contact lenses. In particular, the present invention is related to a method for cast-molding of silicone hydrogel contact lenses under a spatial limitation of actinic radiation.

BACKGROUND

A great effort has been made to develop technologies for cast molding of hydrogel contact lenses with high precision, fidelity and reproducibility and at low cost. One of such manufacturing technologies is the so-called Lightstream Technology™ (CIBA Vision) involving a lens-forming composition being substantially free of monomers and comprising a substantially purified prepolymer with ethylenically-unsaturated groups, reusable molds, and curing under a spatial limitation of actinic radiation (e.g., UV), as described in U.S. Pat. Nos. 5,508,317, 5,583,463, 5,789,464, and 5,849,810. The Lightstream Technology™ for making contact lenses have several advantages. First, the curing process is fast, at a time scale of seconds. Fast curing can ensure design and adaptation of a high speed, continuous and automatic lens production involving on-line lens curing. Second, by using a composition comprising a prepolymer and being substantially free of monomers, subsequent extraction steps (removing unpolymerized monomers from the lenses) required in a traditional cast-molding manufacturing process are eliminated. Without lens extraction, the production cost can be reduced and the production efficiency can be further enhanced. Third, reusable quartz/glass molds or reusable plastic molds, not disposable plastic molds, can be used, because, following the production of a lens, these molds can be cleaned rapidly and effectively of the uncrosslinked prepolymer and other residues, using a suitable solvent and can be blown dried with air. Disposable plastic molds inherently have variations in the dimensions, because, during injection-molding of plastic molds, fluctuations in the dimensions of molds can occur as a result of fluctuations in the production process (temperatures, pressures, material properties), and also because the resultant molds may undergo non-uniformly shrinking after the injection molding. These dimensional changes in the mold may lead to fluctuations in the parameters of contact lenses to be produced (peak refractive index, diameter, basic curve, central thickness etc.) and to a low fidelity in duplicating complex lens design. By using reusable molds which are produced in high precision, one can eliminate dimensional variations inherently presented in disposable molds and thereby variation in contact lenses produced therefrom. Lenses produced according to the Lightstream Technology™ can have high consistency and high fidelity to the original lens design.

However, there are some practical limitations which hinder realization of all of the great potentials of such technology in the production of silicone hydrogel contact lenses. For example, when a silicone-containing prepolymer disclosed in commonly-owned U.S. Pat. Nos. 7,091,283, 7,268,189 and 7,238,750 is used to prepare a silicone hydrogel lens formulation, an organic solvent is generally required to solubilize the prepolymer. When such lens formulation is used to produce silicone hydrogel according to the Lightstream Technology™, the cured lens in the mold after UV crosslinking is still swollen in the organic solvent before the solvent exchange to water. Such lens may not be able to survive the mold opening and de-molding process, because the cured lens is in the swollen state in the organic solvent and has an inadequate stiffness and toughness (e.g., too low). As such, the production yield may be low and the production cost could be higher due to low production yield derived from the lens defects created during mold opening and de-molding process.

Accordingly, there is still a need for a lens manufacturing process in which lens defects generated during mold opening and de-molding process can be minimized.

SUMMARY OF THE INVENTION

In accomplishing the foregoing, the present invention provides a method for producing contact lenses. The method comprises the steps of: (1) obtaining a fluid polymerizable composition, wherein the composition comprises a solvent mixture and dissolved therein a polymerizable material including at least one silicone-containing prepolymer having two or more actinically crosslinkable groups, wherein the solvent mixture includes an organic solvent capable of solubilizing the prepolymerizable material to form a solution, and water in an amount from about 1% to about 20% by weight of the solvent mixture; (2) introducing the fluid composition into a cavity formed by a mold, wherein the mold has a first mold half with a first molding surface defining the anterior surface of a contact lens and a second mold half with a second molding surface defining the posterior surface of the contact lens, wherein said first and second mold halves are configured to receive each other such that a cavity is formed between said first and second molding surfaces; and (3) actinically irradiating the fluid composition in the mold to crosslink said polymerizable material to form the contact lens, wherein the water is present in the fluid composition in an amount sufficient to provide an increased mechanical strength to the contact lens before mold opening.

DETAILED DESCRIPTION OF EMBODIMENTS OF THE INVENTION

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

An "ophthalmic device", as used herein, refers to a contact lens (hard or soft), an intraocular lens, a corneal onlay, other ophthalmic devices (e.g., stents, glaucoma shunt, or the like) used on or about the eye or ocular vicinity.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens. A "silicone hydrogel contact lens" refers to a contact lens comprising a silicone hydrogel material.

The "front or anterior surface" of a contact lens, as used herein, refers to the surface of the lens that faces away from the eye during wear. The anterior surface, which is typically substantially convex, may also be referred to as the front curve of the lens.

The "rear or posterior surface" of a contact lens, as used herein, refers to the surface of the lens that faces towards the eye during wear. The rear surface, which is typically substantially concave, may also be referred to as the base curve of the lens.

A "hydrogel" or "hydrogel material" refers to a polymeric material which can absorb at least 10 percent by weight of water when it is fully hydrated.

A "silicone hydrogel" refers to a silicone-containing hydrogel obtained by copolymerization of a polymerizable composition comprising at least one silicone-containing monomer or at least one silicone-containing macromer or at least one crosslinkable silicone-containing prepolymer.

"Hydrophilic," as used herein, describes a material or portion thereof that will more readily associate with water than with lipids.

A "monomer" means a low molecular weight compound that can be polymerized and comprises one or more actinically crosslinkable groups. Low molecular weight typically means average molecular weights less than 700 Daltons.

An "actinically-crosslinkable group" refers to a group which can react with another group of same type or different type to form a covalent linkage upon actinic irradiation. Examples of actinically-crosslinkable groups include without limitation acryl groups, thiol groups, and ene-containing groups. Acryl groups can undergo free-radical chain reaction upon actinic irradiation. Thiol groups (—SH) and ene-containing groups can participate in thiol-ene step-growth radical polymerization as described in a commonly-owned copending U.S. patent application No. 60/869,812 filed Dec. 13, 2006 (entitled "PRODUCTION OF OPHTHALMIC DEVICES BASED ON PHOTO-INDUCED STEP GROWTH POLYMERIZATION"), herein incorporated in reference in its entirety.

An "acryl group" is an organic radical having a formula of

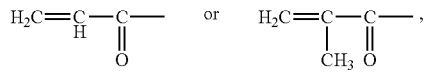

provided the carbonyl is connected to O or N.

A "ene-containing group" is a mono-valent or divalent radical contains a carbon-carbon double which is not directly linked to a carbonyl group (—CO—), nitrogen atom, or oxygen atom and is defined by any one of formula (I)-(III)

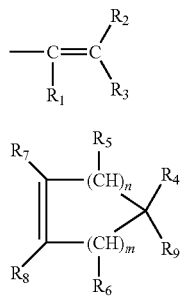

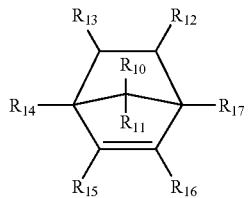

in which $R_1$ is hydrogen, or $C_1$-$C_{10}$ alkyl; $R_2$ and $R_3$ independent of each other are hydrogen, $C_1$-$C_{10}$ alkene divalent radical, $C_1$-$C_{10}$ alkyl, or —$(R_{18})_a$—$(X_1)_b$—$R_{19}$ in which $R_{18}$ is $C_1$-$C_{10}$ alkene divalent radical, $X_1$ is an ether linkage (—O—), a urethane linkage (—N), a urea linkage, an ester linkage, an amid linkage, or carbonyl, $R_{19}$ is hydrogen, a single bond, amino group, carboxylic group, hydroxyl group, carbonyl group, $C_1$-$C_{12}$ aminoalkyl group, $C_1$-$C_{18}$ alkylaminoalkyl group, $C_1$-$C_{18}$ carboxyalkyl group, $C_1$-$C_{18}$ hydroxyalkyl group, $C_1$-$C_{18}$ alkylalkoxy group, $C_1$-$C_{12}$ aminoalkoxy group, $C_1$-$C_{18}$ alkylaminoalkoxy group, $C_1$-$C_{18}$ carboxyalkoxy group, or $C_1$-$C_{18}$ hydroxyalkoxy group, a and b independent of each other is zero or 1, provided that only one of $R_2$ and $R_3$ is a divalent radical; $R_4$-$R_9$, independent of each other, are hydrogen, $C_1$-$C_{10}$ alkene divalent radical, $C_1$-$C_{10}$ alkyl, or —$(R_{18})_a$—$(X_1)_b$—$R_{19}$, provided that only one or two of $R_4$-$R_9$ are divalent radicals; n and m independent of each other are integer number from 0 to 9, provided that the sum of n and m is an integer number from 2 to 9; $R_{10}$-$R_{17}$, independent of each other, are hydrogen, $C_1$-$C_{10}$ alkene divalent radical, $C_1$-$C_{10}$ alkyl, or —$(R_{18})_a$—$(X_1)_b$—$R_{19}$, provided that only one or two of $R_{10}$-$R_{17}$ are divalent radicals.

A "vinylic monomer", as used herein, refers to a monomer that has an ethylenically unsaturated group and can be polymerized actinically or thermally.

The term "olefinically unsaturated group" or "ethylentically unsaturated group" is employed herein in a broad sense and is intended to encompass any groups containing a >C=C< group. Exemplary ethylenically unsaturated groups include without limitation acryloyl, methacryloyl, allyl, vinyl, styrenyl, or other C=C containing groups.

As used herein, "actinically" in reference to curing, crosslinking or polymerizing of a polymerizable composition, a prepolymer or a material means that the curing (e.g., crosslinked and/or polymerized) is performed by actinic irradiation, such as, for example, UV irradiation, ionized radiation (e.g. gamma ray or X-ray irradiation), microwave irradiation, and the like. Thermal curing or actinic curing methods are well-known to a person skilled in the art.

A "hydrophilic monomer" refers to a monomer which can be polymerized to form a polymer that is water-soluble or can absorb at least 10 percent by weight of water.

A "hydrophobic monomer", as used herein, refers to a monomer which is polymerized to form a polymer that is insoluble in water and can absorb less than 10 percent by weight water.

A "macromer" refers to a medium and high molecular weight compound which can be polymerized and/or crosslinked and comprise one or more actinically-crosslinkable groups. Medium and high molecular weight typically means average molecular weights greater than 700 Daltons.

A "prepolymer" refers to a starting polymer which contains actinically crosslinkable groups and can be cured (e.g., crosslinked) actinically to obtain a crosslinked polymer having a molecular weight much higher than the starting polymer.

A "silicone-containing prepolymer" refers to a prepolymer which contains silicone and can be crosslinked actinically to obtain a crosslinked polymer having a molecular weight much higher than the starting polymer.

"Molecular weight" of a polymeric material (including monomeric or macromeric materials), as used herein, refers to the number-average molecular weight unless otherwise specifically noted or unless testing conditions indicate otherwise.

"Polymer" means a material formed by polymerizing one or more monomers.

As used herein, the term "multiple" refers to three or more.

A "photoinitiator" refers to a chemical that initiates radical crosslinking/polymerizing reaction by the use of light. Suitable photoinitiators include, without limitation, benzoin methyl ether, diethoxyacetophenone, a benzoylphosphine oxide, 1-hydroxycyclohexyl phenyl ketone, Darocure® types, and Irgacure® types, preferably Darocure® 1173, and Irgacure® 2959.

A "thermal initiator" refers to a chemical that initiates radical crosslinking/polymerizing reaction by the use of heat energy. Examples of suitable thermal initiators include, but are not limited to, 2,2'-azobis (2,4-dimethylpentanenitrile), 2,2'-azobis (2-methylpropanenitrile), 2,2'-azobis (2-methylbutanenitrile), peroxides such as benzoyl peroxide, and the like. Preferably, the thermal initiator is 2,2'-azobis(isobutyronitrile) (AIBN).

A "spatial limitation of actinic radiation" refers to an act or process in which energy radiation in the form of rays is directed by means of, for example, a mask or screen or combinations thereof, to impinge, in a spatially restricted manner, onto an area having a well defined peripheral boundary. For example, a spatial limitation of UV radiation can be achieved by using a mask or screen which has a transparent or open region (unmasked region) surrounded by a UV impermeable region (masked region), as schematically illustrated in FIGS. 1-9 of U.S. Pat. No. 6,627,124 (herein incorporated by reference in its entirety). The unmasked region has a well defined peripheral boundary with the masked region.

"Visibility tinting" in reference to a lens means dying (or coloring) of a lens to enable the user to easily locate a lens in a clear solution within a lens storage, disinfecting or cleaning container. It is well known in the art that a dye and/or a pigment can be used in visibility tinting a lens.

"Dye" means a substance that is soluble in a solvent and that is used to impart color. Dyes are typically translucent and absorb but do not scatter light. Any suitable biocompatible dye can be used in the present invention.

A "Pigment" means a powdered substance that is suspended in a liquid in which it is insoluble. A pigment can be a fluorescent pigment, phosphorescent pigment, pearlescent pigment, or conventional pigment. While any suitable pigment may be employed, it is presently preferred that the pigment be heat resistant, non-toxic and insoluble in aqueous solutions.

The term "fluid" as used herein indicates that a material is capable of flowing like a liquid.

"Surface modification", as used herein, means that an article has been treated in a surface treatment process (or a surface modification process) prior to or posterior to the formation of the article, in which (1) a coating is applied to the surface of the article, (2) chemical species are adsorbed onto the surface of the article, (3) the chemical nature (e.g., electrostatic charge) of chemical groups on the surface of the article are altered, or (4) the surface properties of the article are otherwise modified. Exemplary surface treatment processes include, but are not limited to, a surface treatment by energy (e.g., a plasma, a static electrical charge, irradiation, or other energy source), chemical treatments, the grafting of hydrophilic monomers or macromers onto the surface of an article, mold-transfer coating process disclosed in U.S. Pat. No. 6,719,929 (herein incorporated by reference in its entirety), the incorporation of wetting agents into a lens formulation for making contact lenses proposed in U.S. Pat. Nos. 6,367,929 and 6,822,016 (herein incorporated by references in their entireties), reinforced mold-transfer coating disclosed in U.S. patent application No. 60/811,949 (herein incorporated by reference in its entirety), and layer-by-layer coating ("LbL coating") obtained according to methods described in U.S. Pat. Nos. 6,451,871, 6,719,929, 6,793,973, 6,811,805, 6,896,926 (herein incorporated by references in their entirety).

An "antimicrobial agent", as used herein, refers to a chemical that is capable of decreasing or eliminating or inhibiting the growth of microorganisms such as that term is known in the art.

"Antimicrobial metal nanoparticles" refer to particles which is made essentially of an antimicrobial metal and have a size of less than 1 micrometer. The antimicrobial metal in the antimicrobial metal nanoparticles can be present in one or more of its oxidation states. For example, silver-containing nanoparticles can contain silver in one or more of its oxidation states, such as $Ag^0$, $Ag^{1+}$, and $Ag^{2+}$.

The "oxygen transmissibility" of a lens, as used herein, is the rate at which oxygen will pass through a specific ophthalmic lens. Oxygen transmissibility, Dk/t, is conventionally expressed in units of barrers/mm, where t is the average thickness of the material [in units of mm] over the area being measured and "barrer/mm" is defined as:

$$[(cm^3\ oxygen)/(cm^2)(sec)(mm^2\ Hg)] \times 10^{-9}$$

The intrinsic "oxygen permeability", Dk, of a lens material does not depend on lens thickness. Intrinsic oxygen permeability is the rate at which oxygen will pass through a material. Oxygen permeability is conventionally expressed in units of barrers, where "barrer" is defined as:

$$[(cm^3\ oxygen)(mm)/(cm^2)(sec)(mm^2\ Hg)] \times 10^{-10}$$

These are the units commonly used in the art. Thus, in order to be consistent with the use in the art, the unit "barrer" will have the meanings as defined above. For example, a lens having a Dk of 90 barrers ("oxygen permeability barrers") and a thickness of 90 microns (0.090 mm) would have a Dk/t of 100 barrers/mm $$\left(\frac{90 \times 10^{-10}}{0.09} = 100 \times 10^{-9}\right)(\text{oxygen transmissibility barrers/mm}).$$

In accordance with the invention, a high oxygen permeability in reference to a material or a contact lens characterized by apparent oxygen permeability of at least 40 barrers or larger measured with a sample (film or lens) of 100 microns in thickness according to a coulometric method described in Examples.

The "ion permeability" through a lens correlates with both the Ionoflux Diffusion Coefficient and the Ionoton Ion Permeability Coefficient.

The Ionoflux Diffusion Coefficient, D, is determined by applying Fick's law as follows:

$$D = -n'/(A \times dc/dx)$$

where n'=rate of ion transport [mol/min]
A=area of lens exposed [mm$^2$]
D=Ionoflux Diffusion Coefficient [mm$^2$/min]

dc=concentration difference [mol/L]

dx=thickness of lens [mm]

The Ionoton Ion Permeability Coefficient, P, is then determined in accordance with the following equation:

$$\ln(1-2C(t)/C(0))=-2APt/Vd$$

where: $C(t)$=concentration of sodium ions at time t in the receiving cell $C(0)$=initial concentration of sodium ions in donor cell A=membrane area, i.e., lens area exposed to cells V=volume of cell compartment (3.0 ml)

d=average lens thickness in the area exposed

P=permeability coefficient

An Ionoflux Diffusion Coefficient, D, of greater than about $1.5 \times 10^{-6}$ mm$^2$/min is preferred, while greater than about $2.6 \times 10^{-6}$ mm$^2$/min is more preferred and greater than about $6.4 \times 10^{-6}$ mm$^2$/min is most preferred.

It is known that on-eye movement of the lens is required to ensure good tear exchange, and ultimately, to ensure good corneal health. Ion permeability is one of the predictors of on-eye movement, because the permeability of ions is believed to be directly proportional to the permeability of water.

In general, the invention is directed to a method for producing silicone hydrogel contact lenses. A method of the invention is characterized by minimizing lens defects generated during mold opening and de-molding process. The invention is partly based on the discovery that enhancement of the mechanical strength of the lens polymeric material before mold opening can be achieved by adding a small amount of water into an organic solvent which dissolves a prepolymer to form a lens formulation for making lens polymeric material. A silicone hydrogel lens generally has a low modulus, e.g., less than 1.5 MPa (hydrated in water). Because of the presence of organic solvent in the lens formulation, an in-situ lens (i.e., a lens obtained immediately after curing the lens formulation in a mold and before opening the mold and subject to solvent exchange or hydration process) is swelled by the organic solvent. Because of the in-situ lens being in a solvent-swollen state, the lens polymeric material could have a very low stiffness and toughness, so low that during mold opening and de-molding process, the in-situ lens could be torn partially or completely so as to produce defects. It is believed that, by using a solvent mixture containing a small amount of water in preparation of lens formulation, the resultant in-situ lens could have enhanced mechanical strength sufficiently to survive mold opening and de-molding process. By using such method, one can increase the product yield.

The invention is also partly based on the discovery that use of a solvent mixture including a small amount of water in preparation of lens formulation can accelerate curing kinetics. It is believed that a silicone-containing prepolymer for making silicone hydrogel material comprises both hydrohphilic and hydrophobic segments and typically most of the actinically crosslinkable groups are linked to hydrophilic segments. It is believed that the presence of a small amount of water may induce a microscopic (partially or completely) phase separation (in microscopic scale) into hydrophilic and hydrophobic microscopic domains (segregation of hydrohphilic or hydrophobic segments) and thereby may reduce average distances between the actinically-crosslinkable groups. Such decrease in distance between the actinically-crosslinkable groups could make the crosslinking reaction faster.

The present invention provides a method for producing contact lenses. The method comprises the steps of: (1) obtaining a fluid polymerizable composition, wherein the composition comprises a solvent mixture and dissolved therein a polymerizable material including at least one silicone-containing prepolymer having two or more actinically crosslinkable groups and a solvent mixture, wherein the solvent mixture includes an organic solvent capable of solublizing the polymerizable material to form a solution, and water in an amount from about 1% to about 20% by weight of the solvent mixture; (2) introducing the fluid composition into a cavity formed by a mold, wherein the mold has a first mold half with a first molding surface defining the anterior surface of a contact lens and a second mold half with a second molding surface defining the posterior surface of the contact lens, wherein said first and second mold halves are configured to receive each other such that a cavity is formed between said first and second molding surfaces; and (3) actinically irradiating the fluid composition in the mold to crosslink said polymerizable material to form the contact lens, wherein the water is present in the fluid composition in an amount sufficient to provide an increase in the mechanical strength of the contact lens before mold opening.

Polymerizable materials (or silicone hydrogel lens-forming materials) for making contact lenses are well known to a person skilled in the art. A polymerizable material can comprise at least one silicon-containing prepolymer, monomer, macromer or combination thereof. In accordance with the invention, the polymerizable material comprises at least one silicone-containing prepolymer. The silicone prepolymer comprises actinically crosslinkable groups, preferably at least three actinically crosslinkable groups selected from the group consisting of acryl groups, thiol groups, ene-containing groups, and combination thereof.

Where crosslinking of a prepolymer of the invention is based on the mechanism of free radical chain-growth polymerization, the prepolymer comprises at least two acryl groups, preferably at least three acryl groups.

Where crosslinking of a prepolymer of the invention is based on the mechanism of thiol-ene step-growth radical polymerization, the actinically crosslinkable groups of the prepolymer preferably comprises at least three thiol groups or at least three ene-containing groups.

Where the prepolymer comprises multiple ene-containing groups, these groups undergo thiol-ene step-growth radical polymerization in the presence of thiol groups which can be provided by a step-growth-crosslinking agent having two or more thiol groups. Similarly, where the prepolymer comprises multiple thiol groups, these groups undergo thiol-ene step-growth radical polymerization in the presence of ene-containing groups which can be provided by a step-growth-crosslinking agent having two or more ene-containing groups.

Any suitable actinically-crosslinkable silicone-containing prepolymer can be used in the invention. Preferably, a silicone-containing prepolymer comprises hydrophilic segments and hydrohphobic segments. Examples of silicone-containing prepolymers are those described in commonly-owned U.S. Pat. Nos. 6,039,913, 7,091,283, 7,268,189 and 7,238,750, and U.S. patent application Ser. No. 09/525,158 filed Mar. 14, 2000 (entitled "Organic Compound"), Ser. No. 11/825,961, 60/869,812 filed Dec. 13, 2006 (entitled "PRODUCTION OF OPHTHALMIC DEVICES BASED ON PHOTO-INDUCED STEP GROWTH POLYMERIZATION", 60/869,817 filed Dec. 13, 2006 (entitled "Actinically Curable Silicone Hydrogel Copolymers and Uses thereof"), 60/896,325 filed Mar. 22, 2007 ("Prepolymers with Dangling Polysiloxane-Containing Polymer Chains"), 60/896,326 filed Mar. 22, 2007 ("Silicone-Containing Prepolymers with Dangling Hydrophilic Polymeric Chains"), which are incorporated herein by references in their entireties.

A silicone-containing prepolymer of the invention is capable of forming, preferably in the absence of any hydrophilic vinylic monomer, a silicone hydrogel or contact lens, which has a high oxygen permeability (characterized by an apparent oxygen permeability of at least 40 barrers, preferably at least about 60 barrers, even more preferably at least 80 barrers) and a hydrophilic surface (characterized by having an averaged water contact angle of less than about about 90 degrees or less, preferably about 80 degrees or less, more preferably about 70 degrees or less, even more preferably about 60 degrees or less). The silicone hydrogel material or contact lens preferably has a high ion permeability (characterized by an Ionoflux Diffusion Coefficient, D, of greater than about $1.5 \times 10^{-6}$ mm$^2$/min, preferably greater than about $2.6 \times 10^{-6}$ mm$^2$/min, more preferably greater than about $6.4 \times 10^{-6}$ mm$^2$/min). The silicone hydrogel material or contact lens preferably has an elastic modulus of from about 0.2 MPa to about 2.0 MPa, preferably from about 0.3 MPa to about 1.5 MPa, more preferably from about 0.4 MPa to about 1.2 MPa. The silicone hydrogel material or contact lens preferably has a water content of preferably from about 15% to about 80%, more preferably from about 20% to about 65% by weight when fully hydrated. The water content of a silicone hydrogel contact lens can be measured according to Bulk Technique as disclosed in U.S. Pat. No. 5,849,811.

Preferably, the prepolymers used in the invention are previously purified in any known manner, for example, by precipitation with organic solvents, such as acetone, filtration and washing, extraction in a suitable solvent, dialysis or ultrafiltration, ultrafiltration being especially preferred. By means of that purification process the prepolymers can be obtained in extremely pure form, for example in the form of concentrated solutions that are free, or at least substantially free, from reaction products, such as salts, and from starting materials. The preferred purification process for the prepolymers used in the process according to the invention, ultrafiltration, can be carried out in a manner known to a person skilled in the art. It is possible for the ultrafiltration to be carried out repeatedly, for example from two to ten times. Alternatively, the ultrafiltration can be carried out continuously until the selected degree of purity is attained. The selected degree of purity can in principle be as high as desired. A suitable measure for the degree of purity is, for example, the concentration of dissolved salts obtained as by-products, which can be determined simply in known manner. Thus, after polymerization, the device will not require subsequent purification such as, for example, costly and complicated extraction of unpolymerized matrix-forming material. Furthermore, crosslinking of the prepolymer can take place absent a solvent or in aqueous solution so that a subsequent solvent exchange or the hydration step is not necessary.

Any monomers suitable for making contact lenses can be used in the invention. Preferably, acryl group containing monomers are used in the invention.

Examples of silicone-containing and acryl-containing monomers include, without limitation, methacryloxyalkylsiloxanes, 3-methacryloxypropylpentamethyldisiloxane, bis(methacryloxypropyl)tetramethyl-disiloxane, monomethacrylatedpolydimethylsiloxane, mercapto-terminatedpolydimethylsiloxane, N-[tris(trimethylsiloxy)silylpropyl]acrylamide, N-[tris(trimethylsiloxy)silylpropyl]methacrylamide, tris(pentamethyldisiloxyanyl)-3-methacrylatopropylsilane (T2), and tristrimethylsilyloxysilylpropyl methacrylate (TRIS). A preferred siloxane-containing monomer is TRIS, which is referred to 3-methacryloxypropyltris(trimethylsiloxy) silane, and represented by CAS No. 17096-07-0. The term "TRIS" also includes dimers of 3-methacryloxypropyltris(trimethylsiloxy) silane.

Any suitable siloxane-containing macromer with ethylenically unsaturated group(s) can be used to produce a silicone hydrogel material. A particularly preferred siloxane-containing macromer is selected from the group consisting of Macromer A, Macromer B, Macromer C, and Macromer D described in U.S. Pat. No. 5,760,100, herein incorporated by reference in its entirety. Macromers that contain two or more polymerizable groups (vinylic groups) can also serve as cross linkers. Di and triblock macromers consisting of polydimethylsiloxane and polyakyleneoxides could also be of utility. Such macromers could be mono or difunctionalized with acrylate, methacrylate or vinyl groups. For example one might use methacrylate end capped polyethyleneoxide-block-polydimethylsiloxane-block-polyethyleneoxide to enhance oxygen permeability.

In accordance with the present invention, a polymerizable material can also comprise a hydrophilic vinylic monomer. Nearly any hydrophilic vinylic monomer that can act as a plasticizer can be used in the fluid composition of the invention. Among the preferred hydrophilic monomers are N,N-dimethylacrylamide (DMA), 2-hydroxyethylmethacrylate (HEMA), hydroxyethyl acrylate, hydroxypropyl acrylate, hydroxypropyl methacrylate (HPMA), trimethylammonium 2-hydroxy propylmethacrylate hydrochloride, dimethylaminoethyl methacrylate (DMAEMA), dimethylaminoethylmethacrylamide, acrylamide, methacrylamide, allyl alcohol, vinylpyridine, glycerol methacrylate, N-(1,1dimethyl-3-oxobutyl)acrylamide, N-vinyl-2-pyrrolidone (NVP), acrylic acid, methacrylic acid, and N,N-dimethyacrylamide (DMA).

A polymerizable material can also comprises a hydrophobic monomer. By incorporating a certain amount of hydrophobic vinylic monomer in a polymerizable fluid composition, the mechanical properties (e.g., modulus of elasticity) of the resultant polymer may be improved.

The polymerizable material can optionally but preferably does not comprise one or more monomer and/or one or more crosslinking agents (i.e., compounds with two or more acryl groups or three or more thiol or ene-containing groups and with molecular weight less than 700 Daltons). However, the amount of those components should be low such that the final ophthalmic device does not contain unacceptable levels of unpolymerized monomers and/or crosslinking agents. The presence of unacceptable levels of unpolymerized monomers and/or crosslinking agents will require extraction to remove them, which requires additional steps that are costly and inefficient. But preferably, the polymerizable material is substantially free of monomer and crosslinking agent (i.e., preferably about 2% or less, more preferably about 1% or less, even more preferably about 0.5% or less by weight of combination of monomer and crosslinking agent).

It must be understood that a fluid composition can also comprise various components, such as, for example, polymerization initiators (e.g., photoinitiator or thermal initiator), a visibility tinting agent (e.g., dyes, pigments, or mixtures thereof), UV-blocking (absorbing) agent, photosensitizers, inhibitors, antimicrobial agents (e.g., preferably silver nanoparticles or stabilized silver nanoparticles), bioactive agent, leachable lubricants, fillers, and the like, as known to a person skilled in the art.

A fluid composition preferably further comprise an antimicrobial agent, preferably antimicrobial metal nanoparticles, more preferably silver nanoparticles. These antimicrobial agents should be incorporated in resultant contact lenses so as to impart the resultant contact lenses antimicrobial properties.

A fluid composition preferably further comprises a leachable wetting agent which can be incorporated in resultant contact lenses. A "leachable wetting agent" is intended to describe a wetting material that is not covalently attached to the polymer matrix of a resultant contact lens but instead is physically entrapped in the polymer matrix of the resultant lens.

Any non-crosslinkable hydrophilic polymers can be used as leachable wetting agent in the invention. Exemplary non-crosslinkable hydrophilic polymers include, but are not limited to, polyvinylalcohols (PVAs), polyethylene oxide, polyethylene-polypropylene block copolymers, polyamides, polyimides, polylactone, a homopolymer of a vinyl lactam of formula (I) shown above, a copolymer of at least one vinyl lactam of formula (I) shown above in the presence or in the absence of one or more hydrophilic vinylic comonomers, a homopolymer of acrylamide or methaacrylamide, a copolymer of acrylamide or methacrylamide with one or more hydrophilic vinylic monomers, mixtures thereof.

The number-average molecular weight $M_n$ of the non-crosslinkable hydrophilic polymer is preferably from 20,000 to 500,000, more preferably from 30,000 to 100,000, even more preferably from 35,000 to 70,000.

Initiators, for example, selected from materials well known for such use in the polymerization art, may be included in the lens-forming material in order to promote, and/or increase the rate of, the polymerization reaction. An initiator is a chemical agent capable of initiating polymerization reactions. The initiator can be a photoinitiator or a thermal initiator.

A photoinitiator can initiate free radical polymerization and/or crosslinking by the use of light. Suitable photoinitiators are benzoin methyl ether, diethoxyacetophenone, a benzoylphosphine oxide, 1-hydroxycyclohexyl phenyl ketone and Darocur and Irgacur types, preferably Darocur 1173® and Darocur 2959®. Examples of benzoylphosphine initiators include 2,4,6-trimethylbenzoyldiphenylophosphine oxide; bis-(2,6-dichlorobenzoyl)-4-N-propylphenylphosphine oxide; and bis-(2,6-dichlorobenzoyl)-4-N-butylphenylphosphine oxide. Reactive photoinitiators which can be incorporated, for example, into a macromer or can be used as a special monomer are also suitable. Examples of reactive photoinitiators are those disclosed in EP 632 329, herein incorporated by reference in its entirety. The polymerization can then be triggered off by actinic radiation, for example light, in particular UV light of a suitable wavelength. The spectral requirements can be controlled accordingly, if appropriate, by addition of suitable photosensitizers Examples of suitable thermal initiators include, but are not limited to, 2,2'-azobis (2,4-dimethylpentanenitrile), 2,2'-azobis (2-methylpropanenitrile), 2,2'-azobis (2-methylbutanenitrile), peroxides such as benzoyl peroxide, and the like. Preferably, the thermal initiator is azobisisobutyronite (AIBN).

Examples of preferred pigments include any colorant permitted in medical devices and approved by the FDA, such as D&C Blue No. 6, D&C Green No. 6, D&C Violet No. 2, carbazole violet, certain copper complexes, certain chromium oxides, various iron oxides, phthalocyanine green, phthalocyanine blue, titanium dioxides, etc. See Marmiom D M Handbook of U.S. Colorants for a list of colorants that may be used with the present invention. A more preferred embodiment of a pigment include (C.I. is the color index no.), without limitation, for a blue color, phthalocyanine blue (pigment blue 15:3, C.I. 74160), cobalt blue (pigment blue 36, C.I. 77343), Toner cyan BG (Clariant), Permajet blue B2G (Clariant); for a green color, phthalocyanine green (Pigment green 7, C.I. 74260) and chromium sesquioxide; for yellow, red, brown and black colors, various iron oxides; PR122, PY154, for violet, carbazole violet; for black, Monolith black C-K (CIBA Specialty Chemicals).

The bioactive agent incorporated in the polymeric matrix is any compound that can prevent a malady in the eye or reduce the symptoms of an eye malady. The bioactive agent can be a drug, an amino acid (e.g., taurine, glycine, etc.), a polypeptide, a protein, a nucleic acid, or any combination thereof. Examples of drugs useful herein include, but are not limited to, rebamipide, ketotifen, olaptidine, cromoglycolate, cyclosporine, nedocromil, levocabastine, lodoxamide, ketotifen, or the pharmaceutically acceptable salt or ester thereof. Other examples of bioactive agents include 2-pyrrolidone-5-carboxylic acid (PCA), alpha hydroxyl acids (e.g., glycolic, lactic, malic, tartaric, mandelic and citric acids and salts thereof, etc.), linoleic and gamma linoleic acids, and vitamins (e.g., B5, A, B6, etc.).

A fluid composition of the invention can be prepared by dissolving at least one silicone-containing prepolymer and other components in a solvent mixture. The solvent mixture comprises at least one oraganic solvent and a small amount of water.

Any suitable organic solvent can be used in the invention so long as it can dissolve the polymerizable material to form a solution. Example of organic solvents includes without limiation tetrahydrofuran, tripropylene glycol methyl ether, dipropylene glycol methyl ether, ethylene glycol n-butyl ether, diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimetyl ether, polyethylene glycols, polypropylene glycols, ethyl acetate, butyl acetate, amyl acetate, methyl lactate, ethyl lactate, i-propyl lactate, methylene chloride, 2-butanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, tert-butanol, tert-amyl, alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3, 4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-propanol, t-amyl alcohol, isopropanol, 1-methyl-2-pyrrolidone, N,N-dimethylpropionamide, dimethyl formamide, dimethyl acetamide, dimethyl propionamide, N-methyl pyrrolidinone, and mixtures thereof.

In a preferred embodiment, the organic solvent is a $C_1$-$C_3$ alkanol, preferably propanol or isopropanol). Preferably, the solvent mixture comprises a second organic solvent which is a $C_4$-$C_{18}$ alkanol.

In accordance with the invention, the water is present in the fluid composition in an amount sufficient to impart to the contact lens an increased mechanical strength. Water is present in the solvent mixture in an amount of preferably from about 0.5% to about 20% by weight, more preferably from about 2% to about 15% by weight, even more preferably from about 5% to about 12.5% by weight. It should be understood that the the amount of water should be low enough so as not to induce macroscopic phase separation characterized by the cloudyness of the solution (fluid composition) and the unacceptable optical transparency (i.e., a light transmission at around 500 nm of less than about 85%) of the resultant lens from the composition.

The term "an in-situ lens" refers to a contact lens that is obtained immediately after curing the lens formulation in a mold but before opening the mold and/or subject to solvent exchange or hydration process. As used herein, the solvent exchange or hydration process refers to a process in which after forming a contact lens from a composition including an organic solvent, the resultant lens is in contact with water to replace the solvent by water.

The term "an increased mechanical strength" in reference to an in-situ contact lens means that the in-situ lens obtained from a testing composition including at least one organic solvent and water has a higher mechanical strength (e.g., elastic modulus, tensile strength, or combination thereof), relative to that of a control in-situ lens obtained from a control composition which differs from the testing composition in that there is no water. It is understood that the testing and control compositions have identical polymerizable material and its amount and that the total amounts of solvent in the testing and control compositions are identical. The in-situ lens prepared from the testing composition has a mechanical strength being preferably at least 1.2, more preferably at least 1.35, even more preferably 1.5 folders of the mechanic strength of a control in-situ lens prepared from a control composition.

The fluid composition can be introduced (dispensed) into a cavity formed by a mold according to any known methods.

Lens molds for making contact lenses are well known to a person skilled in the art and, for example, are employed in cast molding or spin casting. For example, a mold (for full cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with a fluid polymerizable composition.

Methods of manufacturing mold sections for cast-molding a contact lens are generally well known to those of ordinary skill in the art. Virtually all materials known in the art for making molds can be used to make molds for making contact lenses. For example, polymeric materials, such as polyethylene, polypropylene, polystyrene, PMMA, a cyclic olefin copolymer, such as for example, Topas® COC grade 8007-S10 (clear amorphous copolymer of ethylene and norbornene) from Ticona GmbH of Frankfurt, Germany and Summit, N.J., Zeonex® and Zeonor® from Zeon Chemicals LP, Louisville, Ky., or the like can be used. Other materials that allow UV light transmission could be used, such as quartz glass and sapphire.

A person skilled in the art will know well how to cast mold lenses from a polymerizable material in molds based on thermal or actinic polymerization.

After the fluid composition is dispensed into the mold, polymerization/crosslinking can be initiated actinically, by means of actinic radiation, such as UV irradiation, ionizing radiation (e.g., gamma or X-ray irradiation). Where the polymerizable material includes prepolymers but is substantially free of monomers and crosslinking agents, the mold containing the lens-forming material can be exposed to a spatial limitation of actinic radiation to crosslink the prepolymers.

In a preferred embodiment, reusable molds are used and the fluid composition is cured actinically under a spatial limitation of actinic radiation to form a contact lens. Examples of preferred reusable molds are those disclosed in U.S. patent application Ser. No. 08/274,942 filed Jul. 14, 1994, Ser. No. 10/732,566 filed Dec. 10, 2003, Ser. No. 10/721,913 filed Nov. 25, 2003, and U.S. Pat. No. 6,627,124, which are incorporated by reference in their entireties.

Opening of the mold so that the molded article can be removed from the mold may take place in a manner known to a person skilled in the art.

Similarly, if the molded contact lens is produced from a solvent solution of an already purified prepolymer according to the invention, it is not necessary to carry out subsequent extraction, but instead of hydration process to replace the solvent.

The molded contact lenses can further subject to further processes, such as, for example, surface treatment, sterilization, and the like.

A contact lens of the invention has an oxygen permeability of preferably at least about 40 barrers, more preferably at least about 60 barrers, even more preferably at least about 80 barrers. In accordance with the invention, an oxygen permeability is an apparent (directly measured when testing a sample with a thickness of about 100 microns) oxygen permeability according to procedures described in Examples.

A contact lens of the invention has an elastic modulus of from about 0.2 MPa to about 2.0 MPa, preferably from about 0.3 MPa to about 1.5 MPa or less, more preferably from about 0.4 MPa to about 1.2 or less.

A contact lens of the invention further has an Ionoflux Diffusion Coefficient, D, of, preferably at least about 1.5× $10^{-6}$ mm$^2$/min, more preferably at least about $2.6 \times 10^{-6}$ mm$^2$/min, even more preferably at least about $6.4 \times 10^{-6}$ mm$^2$/min.

A contact lens of the invention further has a water content of preferably from about 15% to about 75%, more preferably from about 20% to about 55% by weight when fully hydrated. The water content of a silicone hydrogel contact lens can be measured according to Bulk Technique as disclosed in U.S. Pat. No. 5,849,811.

The previous disclosure will enable one having ordinary skill in the art to practice the invention. In order to better enable the reader to understand specific embodiments and the advantages thereof, reference to the following non-limiting examples is suggested. However, the following examples should not be read to limit the scope of the invention.

Example 1

Oxygen Permeability Measurements.

The oxygen permeability of a lens and oxygen transmissibility of a lens material is determined according to a technique similar to the one described in U.S. Pat. No. 5,760,100 and in an article by Winterton et al., (The Cornea: Transactions of the World Congress on the Cornea 111, H. D. Cavanagh Ed., Raven Press: New York 1988, pp 273-280), both of which are herein incorporated by reference in their entireties. Oxygen fluxes (J) are measured at 34° C. in a wet cell (i.e., gas streams are maintained at about 100% relative humidity) using a Dk1000 instrument (available from Applied Design and Development Co., Norcross, Ga.), or similar analytical instrument. An air stream, having a known percentage of oxygen (e.g., 21%), is passed across one side of the lens at a rate of about 10 to 20 cm$^3$/min., while a nitrogen stream is passed on the opposite side of the lens at a rate of about 10 to 20 cm$^3$/min. A sample is equilibrated in a test media (i.e., saline or distilled water) at the prescribed test temperature for at least 30 minutes prior to measurement but not more than 45 minutes. Any test media used as the overlayer is equilibrated at the prescribed test temperature for at least 30 minutes prior to measurement but not more than 45 minutes. The stir motor's speed is set to 1200±50 rpm, corresponding to an indicated setting of 400±15 on the stepper motor controller. The barometric pressure surrounding the system, $P_{measured}$, is measured. The thickness (t) of the lens in the area being exposed for testing is determined by measuring about 10 locations with a Mitotoya micrometer VL-50, or similar instrument, and averaging the measurements. The oxygen concentration in the nitrogen stream (i.e., oxygen which diffuses through the lens) is measured using the DK1000 instrument. The apparent oxygen permeability of the lens material, $Dk_{app}$, is determined from the following formula:

$$Dk_{app} = Jt/(P_{oxygen})$$

where

J=oxygen flux [microliters O$_2$/cm$^2$-minute]
$P_{oxygen} = (P_{measured} - P_{water}$ vapor$) = (\%$ O$_2$ in air stream$)$
[mm Hg]=partial pressure of oxygen in the air stream
$P_{measured}$=barometric pressure (mm Hg)
$P_{water}$ vapor=0 mm Hg at 34° C. (in a dry cell) (mm Hg)
$P_{water}$ vapor=40 mm Hg at 34° C. (in a wet cell) (mm Hg)
t=average thickness of the lens over the exposed test area (mm)
where $Dk_{app}$ is expressed in units of barrers.

The oxygen transmissibility (Dk/t) of the material may be calculated by dividing the oxygen permeability ($Dk_{app}$) by the average thickness (t) of the lens.

Ion Permeability Measurements.

The ion permeability of a lens is measured according to procedures described in U.S. Pat. No. 5,760,100 (herein incorporated by reference in its entirety. The values of ion permeability reported in the following examples are relative ionoflux diffusion coefficients (D/D$_{ref}$) in reference to a lens material, Alsacon, as reference material. Alsacon has an ionoflux diffusion coefficient of 0.314×10$^{-3}$ mm$^2$/minute.

Example 2

Macromers can be prepared according to the procedures described in the examples of the US Patent Application Publication No. US2008/0015315A1 (herein incorporated by reference in its entirety).

A 2-L jacketed reactor is equipped with a heating/chilling loop, reflux condenser, N$_2$-inlet/vacuum adapter, feeding tube adapter and overhead mechanical stirring. A solution is generated by dissolving 90.00 g of PDMS crosslinker produced by the procedure described in Example 1 and 30.00 g of PDMS crosslinker produced by the procedure described in Example 2 in 480 g of 1-propanol. This solution is charged to the reactor and cooled to 8° C. The solution is degassed by evacuating to less than 15 mBar, holding at vacuum for 15 minutes, and then re-pressurizing with dry nitrogen. This degas procedure is repeated for a total of 3 times. The reactor is held under a blanket of dry nitrogen.

In a separate flask, a monomer solution is prepared by mixing 1.50 g of cysteamine hydrochloride, 0.3 g of AIBN, 55.275 g of DMA, 18.43 g of HEA and 364.5 g of 1-propanol in the same manner as described in Example 4. This solution is filtered with a Waterman 540 filter paper, and then added to the reactor through a degas unit and HPLC pump with a flow rate of 3.0 mL/minute. The reaction temperature is then elevated to 68° C. with a heating ramp about one hour.

In a second flask, a feeding solution is prepared by mixing 4.5 g of cysteamine hydrochloride and 395.5 g of 1-propanol and then filtering with Waterman 540 filter paper. When the reactor temperature reaches 68° C., this solution is slowly dosed into the reactor through the degasser/HPLC pump over 3 hours. The reaction is then continued at 68° C. for an additional 3 hours, on which heating has discontinued and the reactor is allowed to cool to room temperature.

The reaction mixture is transferred to a flask and stripped solvent at 40° C. under vacuum on a rotary evaporator until 1000 g of sample remained. The solution is then slowly mixed with 2000 g of deionized water with rapid agitation. Additional solvent is further removed until about 2000 g of sample remain. During this stripping process, the solution gradually becomes an emulsion. The resulting material is purified by ultrafiltration over a 10 kD molecular weight cut-off membrane until the permeate conductance is below 2.5 µS/cm.

This emulsion is then charged to a 2-L reactor equipped with overhead stirring, refrigeration loop, thermometer, and the pH meter and dispensing tip of a Metrohm Model 718 STAT Titrino. The reaction mixture is then cooled to 1° C. 7.99 g of NaHCO$_3$ are charged to the emulsion and stirred to dissolve. The Titrino is set to maintain pH at 9.5 by intermittent addition of 15% sodium hydroxide solution. 11.59 mL of acryloyl chloride are then added over one hour using a syringe pump. The emulsion is stirred for another hour, then the Titrino is set to neutralize the reaction mixture by addition of a 15% solution of hydrochloric acid. The emulsion is then drained from the reactor, diluted to 3.5 L and filtered to 16 µm exclusion. The emulsion is purified by diafiltration (nominal molecular weight cut-off, 10 kD) with deionized water until the permeate conductance is below 2.5 µS/cm, and the polymer is isolated by lyophilization.

A macromonomer prepared according to procedure described above is dissolved in an adequate amount of 1-popanol to make a solution with macromonomer content in the range from 5% to 10%. After the macromonomer is fully dissolved and homogenized, the solution is filtered with 0.45 micron filtration membrane. The filtrate is then slowly concentrated on rotavap until the solid content is in the range around 70%. The concentrated macromonomer solution is used to prepare formulations (60% solid macromer and 0.25% Irgacur2959) with various amounts of water shown in the table. The obtained macromonomer formulations is then fully homogenized. The formulations are characterized by photorheology for viscosity, curing time (at a UV curing Intensity of about 2 mW/cm$^2$) and G' modulus.

| Formulation # | 1-Propanol (%) | Co-solvent (H$_2$O) % | Viscosity mPa·s | Curing Time (sec) | G' kPa |
|---|---|---|---|---|---|
| 1 | 40.0% | 0.0% | 1750 | 14 | 80 |
| 2 | 37.5% | 2.5% | 4550 | 12 | 110 |
| 3 | 35.0% | 5.0% | 6970 | 10 | 120 |

What is claimed is:

1. A method for making a contact lens, comprising the steps of:
   (1) obtaining a fluid polymerizable composition, wherein the composition comprises a solvent mixture and a polymerizable material including at least one silicone-containing prepolymer dissolved therein, wherein the silicone-containing prepolymer includes hydrophilic and hydrophobic segments and two or more actinically crosslinkable groups and is capable of forming, in the absence of any monomer and/or crosslinking agent, a silicone hydrogel contact lens which has at least one property selected from the group consisting of an apparent oxygen permeability of at least 40 barrers, an Ionoflux Diffusion Coefficient D, of greater than about $1.5 \times 10^{-6}$ mm$^2$/min, an elastic modulus of from about 0.2 MPa to about 2.0 MPa, and a water content of from about 15% to about 80% by weight when fully hydrated, wherein the solvent mixture comprises at least one organic solvent and a small amount of water, wherein the organic solvent is capable of dissolving the polymerizable material to form a solution, and wherein the amount of the water present in the solvent mixture is from about 2% to about 15% by weight and is low enough not to induce macroscopic phase separation as characterized by that the fluid polymerizable composition is cloudy and a contact lens made from the polymerizable composition has a light transmissibility (T %) at around 500 nm of less than about 85%;
   (2) introducing the fluid composition into a cavity formed by a mold, wherein the mold has a first mold half with a first molding surface defining the anterior surface of a contact lens and a second mold half with a second molding surface defining the posterior surface of the contact lens, wherein said first and second mold halves are configured to receive each other such that a cavity is formed between said first and second molding surfaces;
   (3) actinically irradiating the fluid composition in the mold to crosslink said polymerizable material to form an in-situ contact lens being in an organic, solvent-swollen state and having an increased mechanical strength of at least 1.2 folders of the mechanic strength of a control in-situ lens prepared from a control composition free of water; and
   (4) opening the mold and removing the in-situ lens in the organic solvent-swollen state from the mold.

2. The method of claim 1, wherein the prepolymer comprises at least two acryl groups.

3. The method of claim 1, wherein the prepolymer comprises two or more thiol groups or two or more ene-containing groups.

4. The method of claim 1, wherein the fluid composition comprises at least one component selected from the group consisting of a polymerization initiator, a visibility tinting agent, a UV-blocking (absorbing) agent, a photosensitizer, an antimicrobial agent, a bioactive agent, a mold releasing agent, and a leachable lubricant.

5. The method of claim 1, wherein the solvent mixture comprises at least one solvent selected from the group consisting of tetrahydrofuran, tripropylene glycol methyl ether, dipropylene glycol methyl ether, ethylene glycol n-butyl ether, diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimethyl ether, polyethylene glycols, polypropylene glycols, ethyl acetate, butyl acetate, amyl acetate, methyl lactate, ethyl lactate, i-propyl lactate, methylene chloride, 2-butanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, tert-butanol, tert-amyl, alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3,4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-propanol, t-amyl alcohol, isopropanol, 1-methyl-2-pyrrolidone, N,N-dimethylpropionamide, dimethyl formamide, dimethyl acetamide, dimethyl propionamide, and N-methyl pyrrolidinone.

6. The method of claim 1, wherein the solvent mixture comprises a $C_1$-$C_3$ alkanol.

7. The method of claim 6, wherein the solvent mixture comprises further a $C_4$-$C_{18}$ alkanol.

8. The method of claim 1, wherein the water is present in the solvent mixture in an amount of from about 5% to about 12.5% by weight.

9. The method of claim 8, wherein the solvent mixture comprises a $C_1$-$C_3$ alkanol.

10. The method of claim 9, wherein the in-situ lens has a mechanical strength of at least 1.5 folders of the mechanical strength of the control lens.

11. The method of claim 1, wherein the polymerizable material is substantially free of any monomer and/or crosslinking agent, wherein the mold is a reusable mold, and wherein the composition in the mold is cured actinically under a spatial limitation of actinic radiation to form the in-situ contact lens.

* * * * *